US011325099B2

(12) United States Patent
Rangari et al.

(10) Patent No.: US 11,325,099 B2
(45) Date of Patent: May 10, 2022

(54) FILTRATION SYSTEM AND METHODS OF USING SUCH SYSTEM FOR IMPROVED WATER FILTRATION

(71) Applicant: TUSKEGEE UNIVERSITY, Tuskegee, AL (US)

(72) Inventors: Vijaya Rangari, Tuskegee, AL (US); Boniface Tiimob, Tuskegee, AL (US); Vitus Apalangya, Tuskegee, AL (US); Shaik Jeelani, Tuskegee, AL (US); Temesgen Samuel, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 7 days.

(21) Appl. No.: 16/668,974

(22) Filed: Oct. 30, 2019

(65) Prior Publication Data
US 2020/0376461 A1   Dec. 3, 2020

Related U.S. Application Data

(62) Division of application No. 15/492,878, filed on Apr. 20, 2017, now Pat. No. 10,583,417.

(51) Int. Cl.
*B01J 20/20* (2006.01)
*B01J 20/02* (2006.01)
(Continued)

(52) U.S. Cl.
CPC ............ *B01J 20/20* (2013.01); *B01D 39/06* (2013.01); *B01J 20/02* (2013.01); *B01J 20/0233* (2013.01);
(Continued)

(58) Field of Classification Search
CPC ...... B01J 20/02; B01J 20/0233; B01J 20/043; B01J 20/20; B01J 20/28007;
(Continued)

(56) References Cited

U.S. PATENT DOCUMENTS

| | | | |
|---|---|---|---|
| 9,809,466 B2 * | 11/2017 | Sharma | ............ B01J 20/28004 |
| 2009/0107925 A1 * | 4/2009 | Burba, III | ............ B01J 20/3433 210/764 |

(Continued)

OTHER PUBLICATIONS

Karumuri et al., Materials Letters 109 (2013) 83-87. (Year: 2013).*
(Continued)

*Primary Examiner* — John Kim
(74) *Attorney, Agent, or Firm* — Terry M. Sanks, Esq.; Beusse Sanks, PLLC

(57) ABSTRACT

A water filtration system is provided that comprises a combination of two components: silver nanoparticles immobilized on a porous carbon solid matrix and calcium carbonate silver nanoparticles. The silver nanoparticles immobilized on the porous carbon solid matrix are prepared in a one-step wet ball milling process that does not use an environmentally hazardous reducing agent or an organic stabilizer. The calcium carbonate in the calcium carbonate silver nanoparticles is preferably isolated from egg shells. The two filter components can be present in any ratio but an approximate 50:50 ratio is preferred. Also provided is an in situ method of preparing silver nanoparticles on active charcoal. Powdered activated charcoal and silver nitrate are mixed together in a mixture of ethanol and water to form a charcoal-silver nitrate solution which is then subjected to ball milling in the presence of polypropylene glycol to produce silver nanoparticles on active charcoal.

17 Claims, 15 Drawing Sheets
(9 of 15 Drawing Sheet(s) Filed in Color)

(51) Int. Cl.
  *B01J 20/04* (2006.01)
  *B01J 20/28* (2006.01)
  *B01J 20/30* (2006.01)
  *B01J 20/32* (2006.01)
  *B01D 39/06* (2006.01)
  *C02F 1/50* (2006.01)
  *C02F 1/28* (2006.01)
  *C02F 1/00* (2006.01)

(52) U.S. Cl.
  CPC ....... *B01J 20/043* (2013.01); *B01J 20/28007* (2013.01); *B01J 20/28016* (2013.01); *B01J 20/28057* (2013.01); *B01J 20/28061* (2013.01); *B01J 20/28069* (2013.01); *B01J 20/3021* (2013.01); *B01J 20/3204* (2013.01); *B01J 20/3236* (2013.01); *C02F 1/001* (2013.01); *C02F 1/283* (2013.01); *C02F 1/505* (2013.01); *B01D 2239/0442* (2013.01); *B01D 2239/10* (2013.01); *B01D 2239/1241* (2013.01); *C02F 2303/04* (2013.01); *C02F 2305/08* (2013.01)

(58) Field of Classification Search
  CPC ............ B01J 20/28016; B01J 20/28057; B01J 20/28061; B01J 20/28069; B01J 20/3204; B01J 20/3021; B01J 20/3236; B01D 39/06; B01D 2239/0442; B01D 2239/10; B01D 2239/1241; C02F 1/001; C02F 1/283; C02F 1/505; C02F 2303/04; C02F 2305/08
  See application file for complete search history.

(56) References Cited

U.S. PATENT DOCUMENTS

| | | | |
|---|---|---|---|
| 2009/0218266 A1* | 9/2009 | Sawafta | C02F 1/688 210/198.1 |
| 2015/0056260 A1* | 2/2015 | Verma | A01N 59/16 424/421 |
| 2017/0209347 A1* | 7/2017 | Das | A61Q 17/005 |

OTHER PUBLICATIONS

Apalangya et al., Applied Surface Science 295 (2015) 109-114 (Year: 2015).*
Booshehri et al., Chemical Engineering Journal 230 (2013) 251-259 (Year: 2013).*
Srinivasan et al., Carbon 57 (2013) 1-10 (Year: 2013).*

* cited by examiner

FILTRATION SYSTEM AND METHODS OF USING SUCH SYSTEM FOR IMPROVED WATER FILTRATION

RELATED APPLICATION

This application is a Divisional of U.S. application Ser. No. 15/492,878 was filed on Apr. 20, 2017, now U.S. Pat. No. 10,583,417, the contents of which are incorporated in their entirety.

FIELD OF THE INVENTION

The present invention relates to a filtration system, and specifically to a water filtration system utilizing a combination of monodisperse (uniformly dispersed) silver nanoparticles in an activated carbon matrix and calcium carbonate/silver nanoparticles.

BACKGROUND

Water filtration and recovery technology is increasingly necessary as water resources are depleted and access to fresh water reservoirs is limited. Additionally, contamination of water sources is occurring from a variety of activities and industries, which include, for example, agricultural, automotive services, and energy exploration. These contaminates include, but are not limited to heavy metals, pesticides, herbicides, antibacterial agents, elevated bacterial levels, detergents, phosphates, petroleum, and petroleum additives. In addition, there is a need for a water filtration system that has a low environmental impact to remove naturally occurring levels of sodium, such as a filtration system to desalinate sea water. A problem exists, then, how to best enable a water filtration system that eliminates unacceptable levels of chemicals, including petroleum contaminates, bacteria, and salts in a water source or supply.

Most of the water that is utilized in certain industrial applications, such as in car washes, must be collected and treated in order to remove contaminants, including petroleum products, pesticides, herbicides, phosphates and detergents.

Additionally, the water that is utilized in other industrial applications, such as energy exploration, including hydraulic fracturing ("fracking") operations, require the use of large amounts of fracturing fluids. As a result, fracking produces large amounts of waste water that may contain high levels of total dissolved solids, fracturing fluid additives, suspended solids, hardness compounds, metals, oil, gas, bacteria and bacteria disinfection agents, both as a result of the process itself as well as the fracturing fluid used during the processing.

Therefore, there is a need for an alternative to storing wastewater in surface ponds at the fracturing site, or transporting wastewater for disposal or underground injection of wastewater, or transporting wastewater for treatment that will allow drill operators to re-use the wastewater to replace and/or supplement fresh water in formulating fracturing fluid for a future well or re-fracturing the same well.

It would be desirable to provide a water filtration and water recovery system that can collect and recycle the water from various wastewater sources, including petroleum-containing water as well as other contaminants from water utilized in various industrial applications, including but not limited to car washes so that the water can be collected and reused. Such a filtering and recovering system would decrease the overall operation costs of high water usage industries by providing a recyclable water source that may be used for a variety of alternative uses. Filtering and recycling the water from industrial operations would also reduce overall costs by eliminating the cost to service industries and energy exploration companies which must comply with various regulations to prevent the release of contaminated water. An additional benefit of filtering and recycling the water is the decrease in cost of using or purchasing water from the local municipalities supply or from alternative sources. Another key benefit of filtering and recovering the water recovered from industrial applications is that the filtered and recovered water will not contain contaminates typically found in a fresh water supply (such as bacteria or naturally occurring levels of heavy metals).

It would also be desirable to have such recycling occur in a continuous processing (or continuous batch processing) and to be able to produce recycled products in the same operation at a car wash site or fracturing site, without the environmental risk of releasing contaminated water to the local water shed or transporting contaminated water to a treatment facility.

Further, it is desirable to be able to produce a water filtration system that has a low environmental impact and its components could be developed without the use of hazardous reducing agents or stabilizing agents, as used in the production of other filtration systems.

Silver nanoparticles and their nanoscale nanocomposites, have become a subject of intense research interest in various fields of science. This growing interest stems from their unique and exclusive nanoscale physical, optical, and electronic properties tailoring them to widespread range of applications in different scientific and industrial backgrounds.

However the high surface energy and reactivity associated with extremely small diameter nanoparticles often leads to undesirable static electrical combinations or aggregation which adversely affects their most sought-after nanosize associated properties. Since the usefulness of silver particles is nanoscale dependent, the challenge is ensure that the particles do not coalesce and form bulk particles. Thus organic and polymeric surfactants are used to stabilize Ag nanoparticles with small diameters which prevent flocculation and sedimentation during and after synthesis. However the high reactivity of these polymeric surfactants and chemical reducing agents poses biological and other environmental hazards which could potentially limit their use. Moreover the formation of some silver-polymer complexes could block the nanosites of the silver metallic particles reducing the effective utilization of the nanoparticle surfaces.

Due to aforementioned concerns, green techniques are being developed for the production of silver nanoparticles that exclude the use of harsh chemical reducing agents. For instance biodegradable, nontoxic $\beta$-D-glucose and starch have been used for the synthesis of silver nanoparticles. These green, inexpensive reducing and capping agents albeit are effective in producing narrow distributed particles, the processing conditions such as high temperatures, pressures and lengthy reaction times require in their hydrothermal associated synthetic techniques lead to formation of bulk particles. Another green technique is the use of organic extracts as reducing and stabilizing agents but the geographical and seasonal variation of the intrinsic active agents in these organic extracts impacts negatively on the consistency of the particle morphology as well as their size.

A promising technique of producing discrete silver nanoparticles is to immobilize the nanoparticles on porous solid supports; this unlike polymeric matrix does not only maximize the exposure of the surface area of the active sites but also increases their aqueous chemical stability.

Activated carbon loaded silver nanocomposite have demonstrated improved antimicrobial properties relative to silver nanoparticles. Literature exists on the immobilization of silver nanoparticles on activated carbon supports. In both studies, the silver nanoparticles are immobilized on few oxygenated groups located on the micrometer pores of the activated carbon particles. Thus the amount of silver nanoparticles that can be loaded is depended on the efficiency of functionalization of the activated carbon. Moreover chemical functionalization is laborious and requires harsh environmentally chemical reagents and conditions to be achieved.

Liquid assisted grinding provides an environmentally sustainable route of producing nanomaterials. The sparing or no use of solvents (toxic solvents), accompanying low energy usage and less waste production increase the eco attractiveness of this technique. A one step successful milling synthesis of the Silver (Ag) and Iron (Fe) nano metals has been demonstrated. However solvent free mechanochemical synthesis introduces particle agglomeration due to the rapid and progressive welding accompanying milling of particles. Conversely wet milling has been shown to restructure particle aggregates leading to reduction of particle size. There thus remains a need for an environmental friendly method of producing silver nanoparticles that would be useful in water filtration systems to kill or inactivate microbes present in water.

SUMMARY OF THE INVENTION

A water filtration system is provided that comprises a combination of two components:
a) silver nanoparticles immobilized on a porous carbon solid matrix; and
b) calcium carbonate silver nanoparticles.

Component a) (the silver nanoparticles immobilized on the porous carbon solid matrix) is prepared in a one-step wet ball milling process that does not use an environmentally hazardous reducing agent or an organic stabilizer.

The calcium carbonate in the calcium carbonate silver nanoparticles is preferably isolated from egg shells.

The two filter components a) and b) can be present in any ratio but an approximate 50:50 ratio is preferred.

The silver nanoparticles are preferably about 10-35 nanometers. The calcium carbonate silver nanoparticles are preferable about 5-20 nm.

Also provided is an in situ method of preparing silver nanoparticles on active charcoal. Powdered activated charcoal and silver nitrate is mixed together in a mixture of ethanol and water to form a charcoal-silver nitrate solution. This charcoal-silver nitrate solution is then subjected ball milling in the presence of polypropylene glycol to produce silver nanoparticles on active charcoal. No reducing agents or organic stabilizers are used in the ball milling process.

Preferably the amount of polypropylene glycol is used at 10% by weight of the charcoal-silver nitrate powder used when dissolving the powdered activated charcoal and silver nitrate The ball milling occurs for preferably about 3 hours and uses stainless steel balls having a diameter of 6 mm. The ball-to-powder (amount of charcoal-silver nitrate powder used in step a) is at a ratio of 19:1 w/w ratio.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B is C 1s; FIG. 4 C is Ag 3d; and FIG. 4D is survey of sample surface.

FIG. 8A is of ball milled AgNO3 (10.0 pg/ml); FIG. 8B is of (I) 1.0 ~g/ml and (II) 10.0 ~g/ml of eggshell/nAg.

FIG. 9A is as-prepared $CaCO_3$/Ag; FIG. 9B is high resolution TEM micrograph, showing lattice planes; and FIG. 9C provides energy dispersive spectroscopy of CaCO3/Ag nanocomposite.

DETAILED DESCRIPTION OF THE INVENTION

Figure 1:
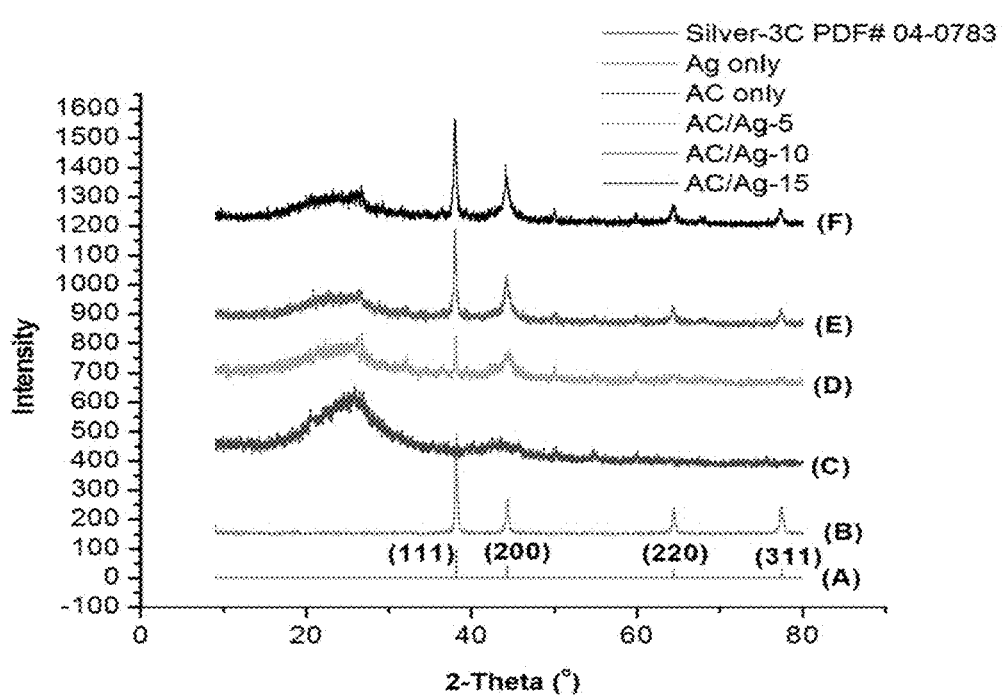
FIG. 1 illustrates an example of X-ray diffraction patterns of (A) silver from library with JCPDS #04-0783 (B) pristine silver nanoparticles (C) only milled activated carbon (D) ball milled 95% activated carbon and 5% silver nitrate (E) 90% activated carbon and 10% silver nitrate (F) 85% activated carbon and 15% silver nitrate.
Figure 2A:
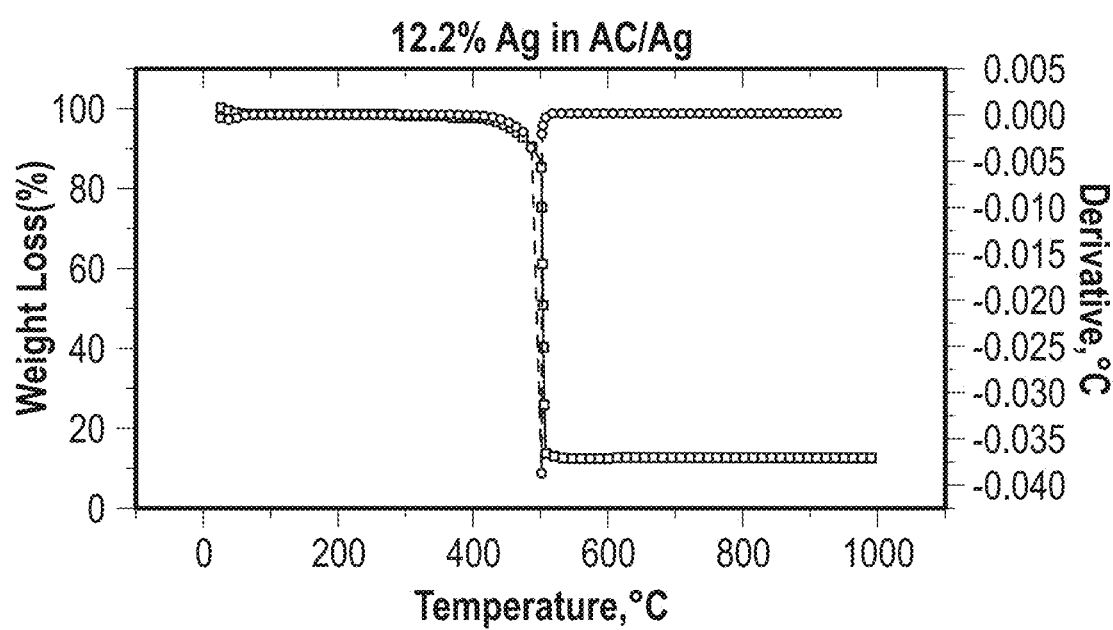
FIG. 2A provides the results of thermogravimetric analysis (TGA) of carbon and carbon/Ag nanocomposite samples and shows AC/Ag-15 (silver residues of 12.2%).
Figure 2B:
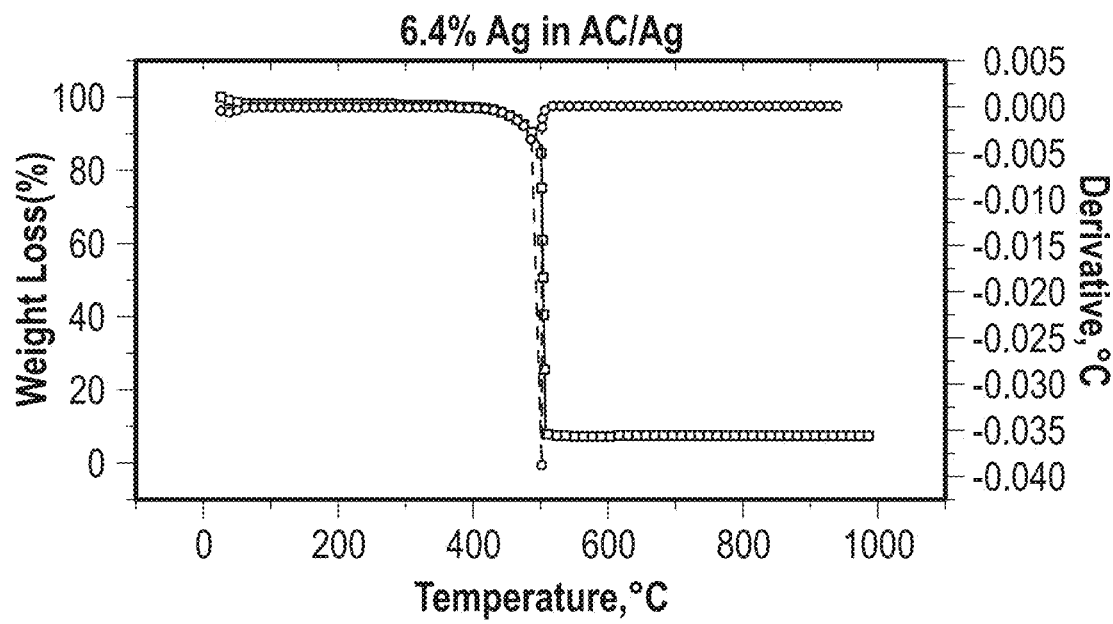
FIG. 2B provides the results of thermogravimetric analysis (TGA) of carbon and carbon/Ag nanocomposite samples and shows AC/AG-10(silver residues of 6.4%).
Figure 2C:
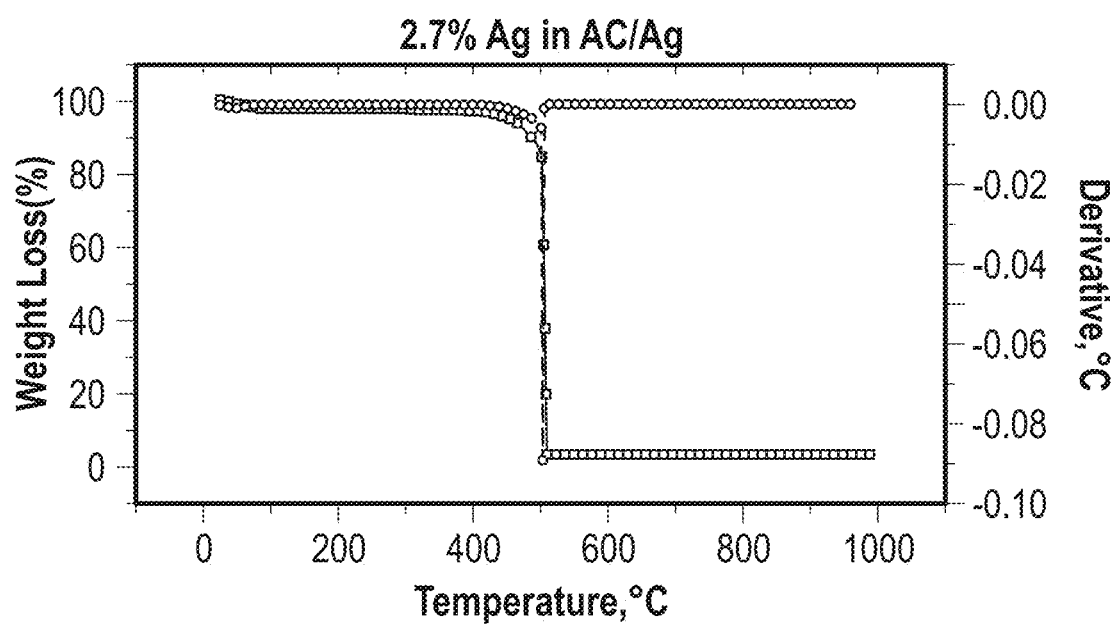
FIG. 2C provides the results of thermogravimetric analysis (TGA) of carbon and carbon/Ag nanocomposite samples and shows AC/Ag-5 (silver residues of 3.4%.
Figure 2D:
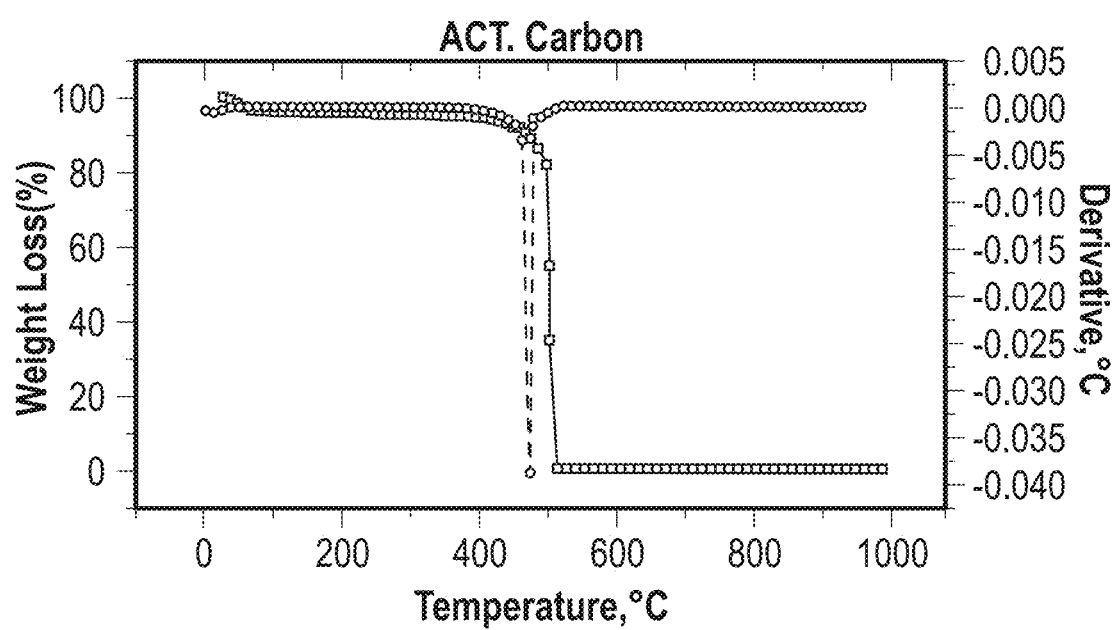
FIG. 2D provides the results of thermogravimetric analysis (TGA) of carbon and carbon/Ag nanocomposite samples and shows AC (silver residues of 0%).

The invention described herein relates to a water filtration system comprising a combination of two components as the filter: a) silver nanoparticles immobilized on a porous carbon solid matrix (often referred to herein as "Ag—C nanoparticles"); and b) calcium carbonate silver nanoparticles (often referred to herein as $CaCO_3Ag$ nanoparticles"). By providing such mixture, water can be purified to remove contaminants such as bacteria (e.g. *E. coli, Salmonella*, gram positive and gram negative bacteria), sulfur and oils. $CaCO_3Ag$ nanoparticles as described herein work alone as does the Ag—C nanoparticles. However, if using Ag—C nanoparticles alone, the water goes through the filer very quickly and some contaminants may not be filtered out completely. $CaCO_3Ag$ nanoparticles made as described herein are very inexpensive but if used alone, the water flows through very slowly. Therefore, a filter having a combination of these two components provides a filter system that purifies out bacterial and other contaminates in a satisfactory time period. In addition, the $CaCO_3Ag$ nanoparticles are relatively inexpensive to manufacture and the combination provides a economical filter.

The filter system may have a) Ag—C nanoparticles; and b) $CaCO_3Ag$ nanoparticles in a 50:50 ratio. The ratio may range from 10:90 to 90:10. Preferred ratios for bacterial removal range from 40:60 to 60:40. Preferred ratios for metals removal is about 80:20 to 90:10. The Ag—C nanoparticles and $CaCO_3Ag$ nanoparticles in the desired ratio is mixed in water and then added to a column chromatography tube. After the nanoparticles have settled and the water has been removed, the filter is ready for use.

The water or other liquid to be filtered is applied to the filter. Usually gravity flow is sufficient but if needed an external pressure via air can be applied on the column top to increase the speed of filtration.

The Ag—C nanoparticles are made by the process described in more detail herein below. Generally, granular activated charcoal and silver nitrate are dispersed and sized reduced in polypropylene glycol for two hours using ball milling. Preferably the silver nanoparticles are 10-30 nm in size and are uniformly distributed on the carbon matrix with no agglomeration.

The $CaCO_3Ag$ nanoparticles are made by the process described in more detail herein below. This process uses eggshells. Eggshells have a unique composition (1% calcium phosphate, 1% magnesium carbonate and 4% (type X collagen, sulfated polysaccharides and other proteins) and they are in an unlimited supply. The eggshells are processed into nanoparticles to produce a porous medium having numerous interstitial spaces. By reducing the eggshells into nanoparticles, new surfaces are created and new chemical function groups are revealed. These chemical functional groups interact with other nanoparticle groups resulting in their immobilization. Further the pores in the nanoparticle sized eggshell particles can confine the nanoparticles and result in the reduction of agglomeration and the formation of clusters.

Silver Nanoparticles Immobilized on a Porous Carbon Solid Matrix ($CaCO_3Ag$ Nanoparticles)

Described herein is a one-step wet ball milling of surfactant free in situ synthesis and high dispersion of silver nanoparticles in activated carbon (AC) matrix without the use of hazardous chemical reducing agents. The production of zero state and free surface silver nanoparticles in the interstices of the activated carbon matrix makes this hybrid material an ideal candidate for the production of water filters, paints and biomaterial with improved antimicrobial properties. The simple and inexpensive ball milling synthesis of AC/Ag nanocomposite from AC/Ag samples produced silver nanoparticles in activated carbon matrix having excellent antibacterial properties without the use of any environmentally hazardous reducing agent and organic stabilizers in the production. The mechanical reduction of granular activated charcoal to smaller size dimension particles provides interstitial spaces that serve as pores for trapping the silver nanoparticles as well as a larger surface area for adsorption. The sequestering of silver nanoparticles in this way confers stability on the silver nanoparticles eliminating the need for the use of polymeric or organic stabilizers. Since there is no bonding between the silver nanoparticles and their host carbon matrix, the former exist in free zero oxidation state with effective maximum functional nanosite surfaces. The carbon/silver nanocomposite plays a dual functional role, as the adsorptive and porous carbon matrix served a support and sites for trapping the silver nanoparticles to form discrete and zero valent silver nanoparticles as well as suitable surfaces for adsorbing the pathogens to close proximity of the silver, which directly interacts with the bacteria resulting in their death.

In addition to providing $CaCO_3Ag$ nanoparticles, the invention provides methods of making these nanoparticles.

Calcium Carbonate Silver Nanoparticles $CaCO_3Ag$ Nanoparticles

Biobased calcium carbonate and silver hybrid nanoparticles were synthesized using a simple mechano-chemical milling technique. The XRD spectrum showed that the hybrid materials are composed of crystalline calcite and silver nanoparticles. The TEM results indicated that the silver nanoparticles are discrete, uncapped and well stabilized in the surface of the eggshell derived calcium carbonate particles. The silver nanoparticles are spherical in shape and 5-20 nm in size. The SEM studies indicated that the eggshells are in micron size with the silver nanoparticle embedded in their surface. The hybrid eggshell/silver nanocomposite exhibited superior inhibition of *E. coli* growth using the Kirby-Bauer discs diffusion assay and comparing the zone of inhibition around the filter paper disc impregnated with the hybrid particles against pristine silver nanoparticles.

Highly dispersed Ag NPs were synthesized and embedded on the surface of the eggshell particles by a simple ball milling technique using chicken eggshell and silver nitrate. The antimicrobial activity of the eggshell/Ag nanocomposite and pristine Ag NPs were studied and compared using modified Kirby-Bauer disc diffusion zone of inhibition. The XRD analysis showed that the eggshell/silver nanocomposite particles composed of calcite and silver nanoparticles. The analysis also indicated that the eggshell particles were crystalline calcite. The silver nanoparticles embedded on the nanocomposite ranged in size from 5-20 nm. The silver nanoparticles are uniformly distributed on the surface eggshell matrix with less agglomeration. The eggshell particles are in micron size and provided surface support for the silver nanoparticles. The eggshell/Ag nanocomposite showed superior antimicrobial properties to that of pristine silver nanoparticles. This is due to the hydrophilic groups of the protein in eggshell which promotes the dispersion of the silver nanocomposite in aqueous solution. The hydrophilic nature of the composite also enables E. coli adherence, facilitating silver-bacterial interaction, hence increasing the antibacterial activity. The porous nature of the eggshell particles of the composite also enables free movement of water and maximizes contact with the silver nanoparticles.

Using filters comprised of the two above described nanoparticles, one can filter water to remove contaminants such as bacterial contaminates include E. Coli and metals, phosporus, oil, grease hexamines, pesticides, and herbicides.

In addition, the filters of the invention can be used to filter out sulfur and oils and other fracking side products/contaminates from fresh water and salt water (although the filters do not function as desalination filters).

EXPERIMENTS

The various experiments described hereafter illustrate the production of zero state and free surface silver nanoparticles in the interstices of the activated carbon matrix for the production of water filtration systems. This one step wet ball milling of surfactant free in situ synthesis and high dispersion of silver nanoparticles in activated carbon matrix illustrates an improved method of creating an improved water filtration components having a reduced environmental impact, since it does not use hazardous chemical reducing agents for the production of the silver nanoparticles or activated carbon.

Experiment 1: In Situ Synthesis of Silver Nanoparticles on Activated Charcoal

Activated charcoal (Black magic super activated carbon) was purchased from Mars Fisher care North America, Inc, Atlanta, Ga. The silver nitrate (purity>99%), polypropylene glycol (purity>98%) and absolute ethanol were purchased from Sigma Aldrich and used without further treatment. Four grams (2 gram in each sample holder) of the powdered activated charcoal with varied percentage weight of silver nitrate (5, 10, 15% wt of charcoal) was dissolved in 20 ml ethanol and water (1:1 v/v) mixture. The silver nitrate solution was transferred to a pair of 65 mL volume cylindrical stainless steel canisters (measuring 57 mm in inner diameter and 76 mm in height) lined by $ZrO_2$ and fixed in a Spex Sample Prep Mixer/Mill 80000 ball milled for 3 hours using 10 stainless steel balls (with diameters of 6 mm) and a ball-to-powder weight ratio of 10:1 was used. The amount of polypropylene glycol used was 10% by the weight of the starting powder. Two grams (2 g) of each of silver nitrate (without charcoal) and activated charcoal (without silver) were also ball milled and cleaned following the same procedure and conditions as the AC/Ag material. The products were cooled down to room temperature and cleaned by washing with a deionized water and ethanol (1:1 v/v) mixture and centrifuged for 10 minutes at 12000 rpm after which the supernatant was removed, this was repeated at least 4 more times. In the last cleaning step, the sample was washed with 70% ethanol and vacuum dried overnight. The product was dried at 75° C. for 3 hours in the oven to ensure complete removal of ethanol. The dried products were characterized using X-Ray Diffraction (XRD), transmission electron microscopy (TEM), Energy Dispersive Spectroscopy (EDS) and Brunauer-Emmett-Teller (BET) as follows.

X-Ray Diffraction (XRD)

XRD analysis was conducted with Rigaku DMAX 2100 diffractometer using monochromatic CuK α radiation ($\lambda$=0.154056 nm) which was ran at 40 kV and 30 mA. The intensity data for the composite nano AC/Ag powder were collected over a 2θ range of 10° to 80° at a scan rate of 0.5° 2θ per minute.

X-Ray Diffraction (XRD) Results

Results of the X-Ray Diffraction are shown in FIG. 1. In particular, FIG. 1 is the XRD spectra of the as-synthesized AC/Ag, AC and pristine silver nanoparticles samples. In C, there is a broad peak but weak in intensity that stretches from 2θ values of about 25° to 30° which is characteristic of amorphous phase of black carbon (activated charcoal) which arises as a result of combination of numerous layers of microcrystalline graphite. This broad peak also occurs in D, E and F for all three different combinations of charcoal/silver composites. An increase in the content of crystalline silver in the composite generally resulted in a decrease in the intensity of this amorphous peak. The intensity of the amorphous peaks of the activated carbon decreases in the order AC<AC/Ag-5<AC/Ag-10<AC/Ag-15, which corresponds to the increasing silver content of the composite in the same order. Conversely the intensities of the four diffraction peaks increases with increasing silver content in the composite as indicated in C through F. This is due to the obvious enhancement of the diffraction peaks intensities resulting from the addition of more crystalline silver nanoparticles in the composite. The prominent peaks at 2θ values of about 37.98°, 43.97°, 64.87° and 76.95° which appeared in B, C, D, E and F matched with the (111), (200), (220) and (311) of Bragg's reflections of face-centered cubic crystalline silver with JCPDS #04-0783 as indicated in curve A of FIG. 1. The indistinct diffraction peaks of AC/Ag-5 composite at 2θ values 64.87° and 76.95° is due to the high background which stems from the low content of silver in the composite as well as the charcoal matrix and other agents. Generally these 2θ values are comparable to those of silver nanoparticles reported in literature. The size of the silver particles (2θ=38.) was estimated using Scherer's formula, $D=0.9\lambda/\beta \cos \theta$, where D is the crystallite size in nm, $\lambda$ is the radiation wavelength (0.154056 nm for Cu Kθ), $\beta$ is the bandwidth at half-height and θ is the diffraction peak angle. The calculated crystallite sizes were in the range of 10-35 nanometers.

Thermal Gravimetric Analysis (TGA)

The TGA of the prepared carbon and carbon/silver nanocomposite samples were carried out under oxygen gas atmosphere on a Mettler Toledo TGA/SDTA 851e apparatus. Samples weights of 10-15 mg were measured into ceramic sample pans. The TGA was carried out from 25-1000° C. at a heating rate of 5° C. per minute.

Brunauer-Emmett-Teller (BET)

The BET surface areas and porosities of the synthesized materials were analyzed using a nitrogen adsorption instrument (Quantachrome Instruments' Autosorb-iQ) surface area analysis. About 0.5 g of sample was loaded in 6 mm pyrex tube with a filler rod and outgassed for 3 h at 200° C. After outgassing, 73 points nitrogen physisorption isotherm was performed at liquid nitrogen temperature (77K). The ASiQ Win software was used to analyze the physisorption isotherms and determined the BET surface area.

Thermogravimetric Analysis (TGA) and Brunauer-Emmett-Teller (BET) Results

FIGS. 2A-2D provide TGA graphs of change in weight of the carbon and the silver nanoparticles embedded in carbon nanocomposites as a function of temperature. The TGA measurement was carried out to determine the amount of silver in the AC/Ag nanocomposite after reduction. After subjecting the samples to heating upto 1000° C., silver particles could be seen on botom of the ceramic pans. The disappearance of the carbon matrix was more likely that the carbon component of the nanocomposite was converted to carbon dioxide ($CO_2$) leaving behind the sparkling silver metal residue. Since the XRD did not show the presence of any silver nitrate spectrum, the silver residue could only be attributed to the silver nanoparticles. The amount of silver nanoparticles in the samples increased in the order AC/Ag-5, AC/Ag-10 and AC/Ag-15 which is consistent with the amount of reagent silver nitrate used in the preparation of the carbon/silver nanocomposite. The amount of silver residue in AC, AC/Ag-5, AC/Ag-10 and AC/Ag-15 samples are respectively 0, 2.98%, 6.05% and 9.32% (See Table 1). Each of these values represents approximately 87% yield relative to their respective expected or theoretical amount of silver nanoparticles.

The ball milled activated charcoal demonstrated higher surface area relative to the un-ball milled charcoal (unAC) (See Table 1). Increasing the concentration of the silver nanoparticles in the composite led to reduction in the surface area of AC/Ag composite from AC/Ag-1 to AC/Ag-3 samples relative to the ball milled activated charcoal, AC (activated charcoal ball milled without silver), which is consistent with earlier studies. However the decrease in surface area of AC/Ag samples is slight and still showed as an enhancement in surface area relative to the untreated, unAC sample. The increase in surface areas of the prepared AC/Ag samples as pores of individual carbon particles shrinks due to the action of milling can be attributed to creation of more interstitial spaces as more particles are created. The disappearance of individual particle pores is compensated by the creation of new interstitial spaces. This is important because the pores of the as prepared samples (the AC/Ag nanocomposite material) are not blocked and are still available for adsorptive applications.

TABLE 1

The percentage weight of silver, Ag(Wt %) in composite and $S_{BET}$ AC/Ag composites

| Sample | Mass (g) | Ag(Wt %)TGA | $S_{BET}$(m$^2$/g) | Porosity |
|---|---|---|---|---|
| unAC | 1.96 | — | 270.86 | 0.370 |
| AC | 1.93 | — | 396.57 | 0.203 |
| AC/Ag-1 | 2.01 | 2.98 | 370.45 | 0.198 |
| AC/Ag-2 | 2.02 | 6.05 | 350.67 | 0.177 |
| AC/Ag-3 | 2.06 | 9.32 | 342.09 | 0.154 |

Transmission Electron Microscopy (TEM)

The size and shape of the nanoparticles were analyzed using a JEOL-2010 transmission electron microscope (TEM), operating at 80 kV. Samples were prepared by dispersing AC/Ag sample in ethanol and depositing a drop of the colloidal solution on a carbon grid (carbon coated copper grid) removing the excess solution using a tissue paper and drying at room temperature.

Energy Dispersive Spectroscopy (EDS)

The microstructures of the composite eggshell/silver nanoparticles were characterized using a SEM JEOL 7000 F operating at 10 kV. The dried powder sample was thinly spread on double sticking carbon tape on a sample holder. The sample is sputter coated with gold particles for 3 minutes.

Transmission Electron Microscopy (TEM) and Energy Dispersive Spectra (EDS)

Figure 3A:
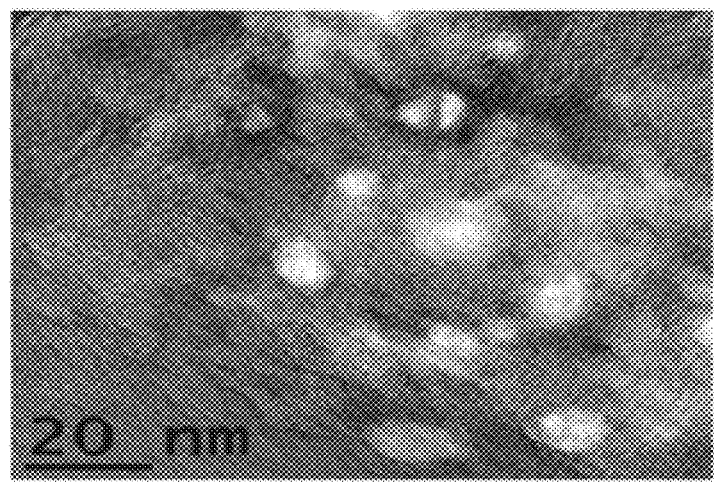
FIG. 3A illustrates a Transmission Electron Microscopy micrograph image of silver nanoparticles in activated carbon (AC) matrix (AC/AG-10).

FIG. 3A is the TEM micrographs of activated carbon and silver nanoparticles after ball milling for 3 hours. The silver nanoparticles are uniformly dispersed on the surface of the AC. The uniform dispersal and localization of the silver nanoparticles on the carbon matrix is due to the confinement of the silver nanoparticles in the numerously ball-milled created interstitial spaces and pores which hirtheto did not exist. The creation of these pores is evident by the increase in surface area of the milled sample relative to the unmilled sample. This lessons the agglomeration of the silver nanoparticles. Moreover the appearance of some of the silver nanoparticles on the surface of the AC could be due to the presence of oxygenated functional groups such as carbonyls, hydroquinon and carbonxylic function groups which are inherently present on the surface of the AC. This could have significant impact on how this material interacts and adsorb metal ions and other environmental politants. The size of silver particles on the carbon matrix is approximately 10 nm or less. The silver nanoparticles appear spherical with few exhibiting irregular shapes. The semblance of two neighboring particles splitting apart coupled with the irregular shapes of the particles in the micrograph strongly suggest that the impact of the ball milling process in physically reducing the size of the silver nanoparticles. It is evident that the reaction rate was progressively enhanced through out the reaction life time. This continuously and dynamically refined the particle microstructure through out the milling the process. It is evident that the particles are monodiscrete and are not agglomerated.

Figure 3B:
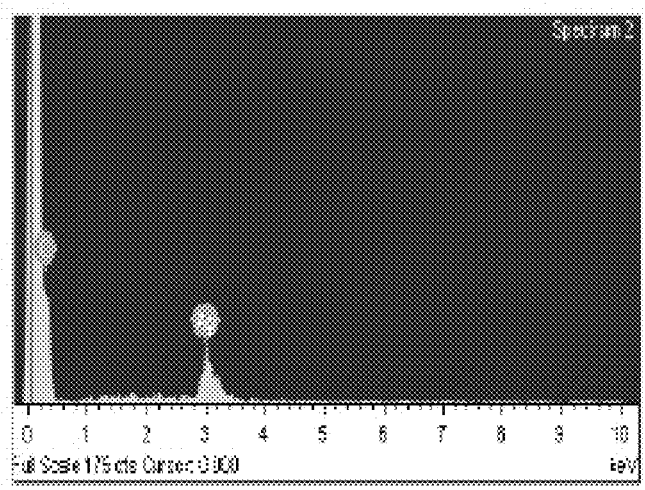
FIG. 3B illustrates an Energy Dispersive Spectra image of silver nanoparticles in activated carbon matrix after 3 hours of milling in water/ethanol mixture.

FIG. 3B is the EDS image of the analysis confirmed the existence of Ag nanoparticles in the AC matrix. The EDS showed that prepared AC/Ag is pure in terms of elemental composition as the only elements present in the composite is desired silver and carbon. The efficient reduction of the silver nitrate to crystalline silver nanoparticles by the ball milling technique is due to both chemical as well as physical reducing of the ball milling.

X-Ray Photoelectron Spectroscopy (XPS) Analysis

The surface chemistry of the composite AC/Ag powders was investigated using X-ray photoelectron spectroscopy (XPS) measurements. The XPS spectra were acquired with a load-locked Kratos XSAM 800 surface analysis system equipped with 127 mm radius double-focusing concentric hemispherical energy analyzer which was also fitted with an aberration compensated input lens (ACIL), using MgKα (1253.6 eV) radiation source exclusively. Wide and detailed XPS spectra which correspond to medium resolution to high signal-to-noise spectra respectively were collected using FAT (fixed analyzer transmission) mode operating at 80 eV. The magnification of the analyzer in the FAT mode was selected to collect electrons from the smallest allowable (5 mm$^2$) area on the specimen. The samples were mounted on the sample holder using a double-sided adhesive carbon tape with specimens pressed into the double-sided carbon tape to a thickness which insured that the emitted photoelectrons would originate only from the specimen. The sample was transferred to the analysis chamber where the base pressure of the ion- and turbo-pumped system was $8\times10^{-9}$ torr as read on a nude ion gauge. The elemental composition was first determined using a wide spectra which was then followed by a detailed acquired spectra for quantitative (peak area) and chemical states analysis. The resolution of the instrument at the operating parameters was measured from FWHM of the $Ag3d_{5/2}$ peak to be 1.0 eV. The XPS energy scale was calibrated by setting the $Ag3d_{5/2}$ line on clean silver to exactly 368.3 eV referenced to the Fermi level. Due to specimen charging during X-ray irradiation, the energy axis of each XPS spectra has been shifted to make the C1s binding energy line coincident with 285.0 eV, which is standard hydrocarbon energy (C—H and C—C bonds), used to reference charge affected materials. The potential measured on a typical sample was ~2 eV.

The photoelectrons were excited by a water-cooled, conventional (i.e., non-monochromatic) dual anode X-ray gun equipped with an Al window. The angle of the incidence of the x-ray beam with the specimen normal was 51.5°. In cases when the peaks were low in amplitude, the Savitsky-Golay smoothing routine was used in order to help determine the peak binding energies, typically measureable to ~0.1 eV on this system. The XPS surface composition was calculated based on the Scofield cross-sectional values accounting for the instrumental transmission function in the FAT mode of operation.

XPS Analysis of AC/Ag Sample

Figure 4A:
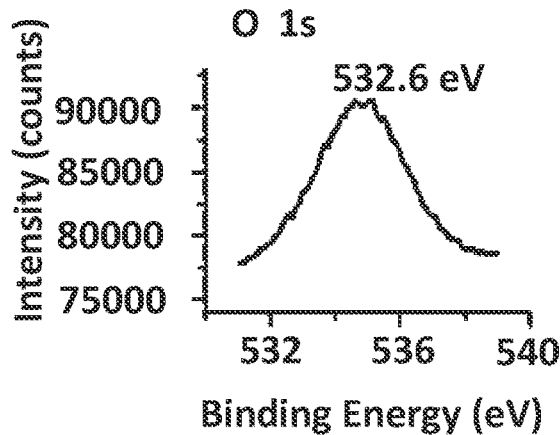
FIGS. 4A-4D illustrate an Ag 3d XPS spectra of Ag and activated carbon nanocomposite particles and the detailed spectra of FIG. 4A is O 1s.
Figure 4C:
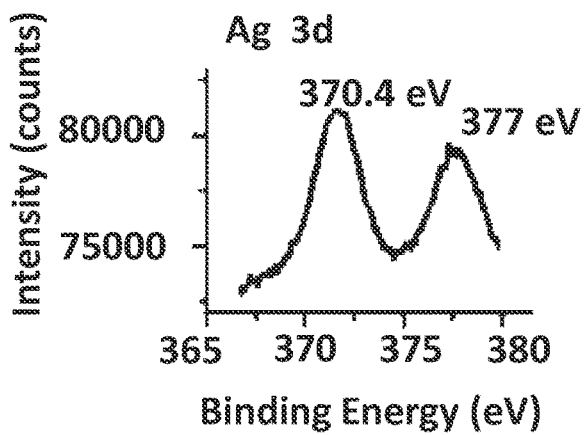
Figure 4B:
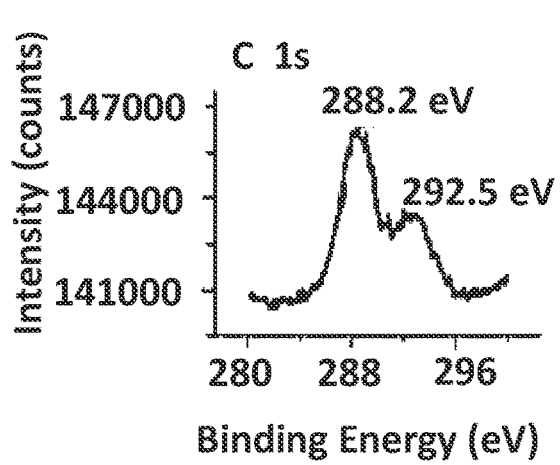
Figure 4D:
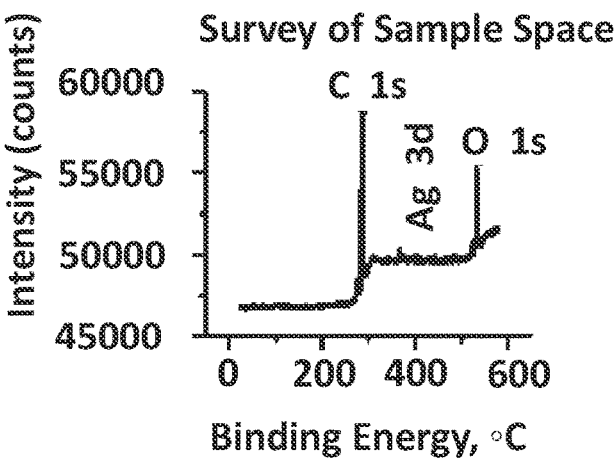

In order to determine the chemical environment and oxidation state of silver atoms on the different kind of NPs, XPS measurements were performed. General surface survey of the AC/Ag nanocomposite and a detailed scan at the Ag 3d (FIG. 4C), O 1 s (FIG. 4A), and C is (FIG. 4B) core levels are shown in FIG. 4. The survey scan (FIG. 4D) showed that the AC/Ag nanocomposite contains carbon and silver. The Ag $3_{d5/2}$ and Ag $3_{d3/2}$ core level binding energies (FIG. 4C) for Ag NPs of the nanocomposite sample appear at 370.4 and 377 eV respectively and these are consistent with bulk metallic silver values. It is known that the size of silver nanoparticles affects the binding energy values of XPS core levels. However these core level values are higher than that of the reported bulk metallic silver core level binding energy values and is in good agreement with literature report that core levels shifts to higher binding energy levels for silver nanoparticles with size less than 10 nm. The Ag 3d line indicates that part of the silver nanoparticles exist in AgO form. This is an indication that the silver nanoparticles are formed by reduction where there is an electron exchange between either the hydroxyl groups of the polypropylene glycol or the carboxylic groups of the activated charcoal and the silver ion ($Ag^+$). This is also in agreement with report that strong interaction between polypropylene glycol and silver nanoparticles that stabilize the silver nanoparticles on the surface of the matrix. The C is core level (FIG. 4B) can be fitted two peaks with binding energies 288.2 and 292.5 eV and these can be assigned to C—C and —C—O— respectively. The peak with binding energy 532.7 eV can be fitted to 0 is core level as shown in FIG. 4A.

Antimicrobial Activity

The antimicrobial activity of the carbon/silver composite was investigated against *Eschericia coli* which were pre-cultured at 37° C. to reach a concentration of about $4.5\times10^7$ colony forming units (CFU/ml). The antibacterial activity of the AC/Ag composites was evaluated by zone of inhibition testing. A standard inoculum of *E. coli* was inoculated by uniformly spreading $10^7$ colony-forming units (CFU) $mL^{-1}$ onto the surface of a McConkey agar plates instead of commonly used Mueller Hinton agar, for the ease of visualization of distinctly pink *E. coli* colonies bacterial lawn. Three circular disc filter papers were placed on the surface of the agar plates, and then impregnated with 5 μL of (2.0 μg/mL) each of AC/Ag composite antibacterial material (AC/Ag-5, AC/Ag-10, AC/Ag-15). Two other Ag/AC free disc filter papers, one impregnated with pristine silver nanoparticles (5.0 μg/mL) and the other without treatment as negative control were also placed on the agar plates alongside the first three. The plates were incubated overnight at 37° C., and the clear zones around the disc were observed and digital images taken.

Figure 5:
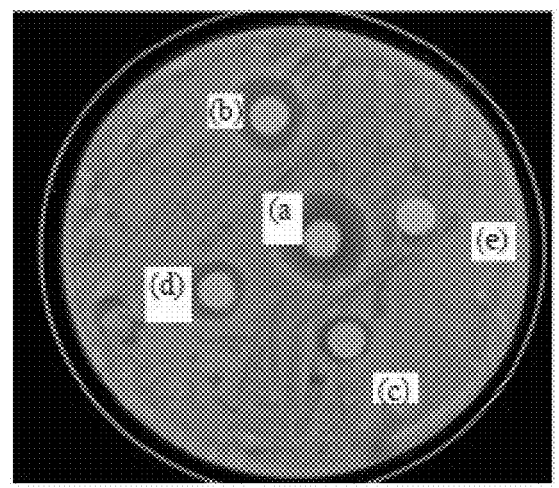
FIG. 5 is a photographic image illustrating in vitro test results of $E.\ coli$ growth inhibition treated with 5 µL of (2.0 µg/mL) each of AC/Ag nanocomposite and pristine NPs (a) AC/Ag-15; (b) AC/Ag-10; (c) AC/Ag-5; (d) pristine silver NPs; and (e) blank filter paper treated with activated charcoal.

The antibacterial properties of the activated charcoal/silver nanocomposites were investigated by comparing their ability to inhibit *E. coli* growth on agar culture dishes. In the modified Kirby-Bauer test, after an overnight incubation of *E. coli* lawn with filter discs impregnated with different concentrations of AC/Ag composite, there was a clear zone of inhibition (ZOI) observed around discs as shown in FIG. 5. The radius of the ZOI increased with increasing concentration of the composite material. The disc paper with AC/Ag-15 treatment has the highest inhibition zone followed by AC/Ag-10 and the least was exhibited by AC/Ag-5 treatment. But, control discs with no silver composite material did not produce any inhibition zones (FIG. 5) disc. The lack of clear ZOI around control disc with no Ag NPs and clear ZOI around discs supplemented with Ag NPs is indicative of the inhibition of bacterial growth around the Ag supplemented discs which resulted from the release of diffusible inhibitory Ag NPs into the surrounding medium.

In FIG. 5, the prinstine Ag NPs exhibited comparable inhibition with the AC/Ag-5 sample. Since the amount of Ag NPs in AC/Ag-5 is less than 2 μg/ml as in the prinstine Ag NPs, it is evident that the AC/Ag composite NPs demonstrated an improved antibacterial properties relative to the prinstine silver NPs. The confinement of the Ag NPs on numerously created interstitial spaces of the carbon matrix create monodesperse and less agglomerated Ag NPs with less interfered active nanosites which make them assessible and facilitate their interaction with bacteria resulting in enhanced bioactivity. Moreover the numerous nano to micron pores or interstitial spaces of the activated charcoal are capable of adsorbing the bacteria to the surface of the composite which increases the chances of interaction of the silver nanoparticles with the bacteria. The reduction of the granular activated charcoal to micron to nanosize using this ball milling provides a larger surface area for the attachment of silver nanoparticles which is similar to attrition ball mill for carbon nanotubes. The carbon/silver nanocomposite plays a synergistic role, as the adsorptive and porous carbon matrix served as support for the silver and adsorb pathogens to porous surface of the composite, the silver nanoparticles on the surface of the nanocomposite interacts directly with pathogens resulting in their death

Example 2: Calcium Carbonate Silver Nanoparticles (CaCO$_3$Ag Nanoparticles)

Materials and Methods

Eggshell materials were received from American Dehydration Food Inc (Atlanta, Ga.). The silver nitrate and polypropylene glycol were purchased from Sigma-Aldrich (Saint Louis, Mo.). The *Escherichia coli* (#11775) was purchased from ATCC (Manassas, Va.). The bacteria growth media LB agar was purchased from Fisher Scientific (Waltham, Mass.).

Extraction of Calcium Carbonate from Waste Eggshells

The eggshells were boiled in water overnight using a rice cooker with the temperature adjusted to 100° C. The shells were cooled down to room temperature and the water was removed. The shells were then grinded using coffee grinder. The grinded colloidal sample was suspended in a large volume of water, stirred and allowed to settle. The supernatant was decanted from the calcium carbonate sediment. This was repeated at least three more times to ensure thorough removal of all lose organic macromolecules. The sample was dried in room temperature and then in oven at 60° C. to remove all volatile components. The sample was further ball milled using 6 mm stainless balls each in polypropylene glycol (PPG) for 5 h to fine colloidal solution. The inorganic component is then extracted from the organic component of the eggshell and the PPG following this procedure. The slurry sample was mixed thoroughly with ethanol and water in a volume ratio of 1:2. The sample is transferred to a separatory funnel and shaken vigorously and allowed to settle on the bench and separate out. The extracted calcium carbonate is then dried in room temperature overnight followed by drying for 3 h in the oven at 60° C. The extracted sample was characterized using X-ray diffraction spectra (XRD).

Synthesis of Eggshell/Silver Nanoparticles

The as-prepared eggshell powder was used without further treatment. Two grams of the eggshell powder was magnetically stirred into a uniform dispersion in 20 ml of deionized water and ethanol (1:2 v/v) mixture for 10 min. Two grams of silver nitrate was dissolved in 10 ml of distill water. The dissolved silver nitrate solution is then added at a rate of 1.0 ml per minute into the eggshell mixture while the content was being stirred at 150 rpm for a total time of 10 min. The dispersed mixture was divided into two and each part added to 5 ml of PPG and ball milled for 2 h using 6 mm stainless balls each as shown in the scheme. The product was washed with 20 ml of distilled water and each time the supernatant was removed by centrifuging at 12,000 rpm for 5 min. In the last step the product was washed with 10 ml of ethanol and then dried in vacuum overnight. In comparative study, silver nanoparticles were prepared using the same procedure as the composite as follows: five hundred milligram (500.0 mg) of silver nitrate was dissolved in 20 ml of deionized water and ethanol (1:2 v/v). The solution was transferred to a stainless steel canister and ball milled for 2 h. A blank experiment was performed to investigate the effect of ball milling on the production silver nanoparticles from AgNO$_3$ without chemical or organic reducing agents. 2 g of AgNO$_3$ was ball milled in stainless steel canisters for 2 h.

UV-vis Spectroscopy

The UV-vis spectroscopic studies were carried out using HP-Agilent Technologies 95-03 8453X UV-vis spectrometer.

Absorption Spectrum Analysis

Figure 8A:
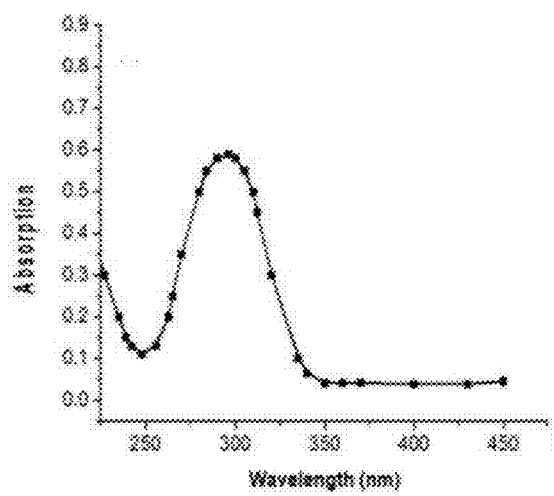
FIGS. 8A and 8B provide UV-vis spectrum.
Figure 8B:
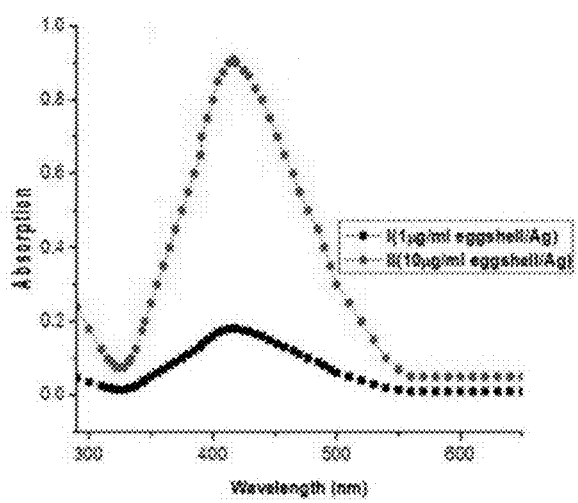
Figure 8C:
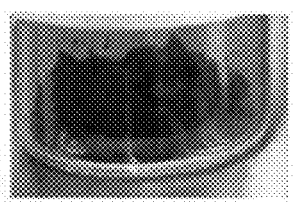
FIG. 8C is a digital image of composite eggshell/silver nanoparticles in a beaker.

The UV-vis absorption spectrum of the synthesized eggshell/silver powder is presented in FIGS. 8A and 8B. FIG. 8A is the UV spectrum of ball milled AgNO$_3$ which processed without organic or chemical reducing agent. There is a maximum absorption at about 300 nm which matches with that for AgNO$_3$. This is an indication that ball milling of AgNO$_3$ without organic or chemical reducing agents does not result in the production of silver nanoparticles. FIG. 8B is the UV absorption spectrum for eggshell/nAg particles. A minimum UV absorption peak exists at 321 that signifies the disappearance of the dielectric function of silver. A single prominent peak with a maximum at 416 nm was observed, which corresponds to the typical surface plasmon resonance (SPR) of spherical silver nanoparticles. In these UV-vis spectra, there were no peaks located around 335 and 560 nm, indicating the complete absence of particle aggregates or clusters. Hence, silver nanoparticles formed are highly stable and well dispersed. The intensity of the SPR peak for silver in curve I (1.0 m/ml) and curve II (10.0 µg/ml) in FIG. 8B was strengthened with increasing concentration of silver in the eggshell/nAg nanocomposite. The intensity of the absorption peaks increased with increasing concentration of the nanocomposite in solution.

X-ray Diffraction (XRD)

XRD analysis were carried out using Rigaku DMAX 2100 diffractometer with monochromatic CuK a radiation ($\lambda$=0.154056 nm) at 40 kV and 30 mA. The intensity data for the nanocomposite of eggshell/Ag powder were collected from 10 to 80° of 2θ at a scan rate of 0.5°2θ per minute.

XRD Results

Figure 7:
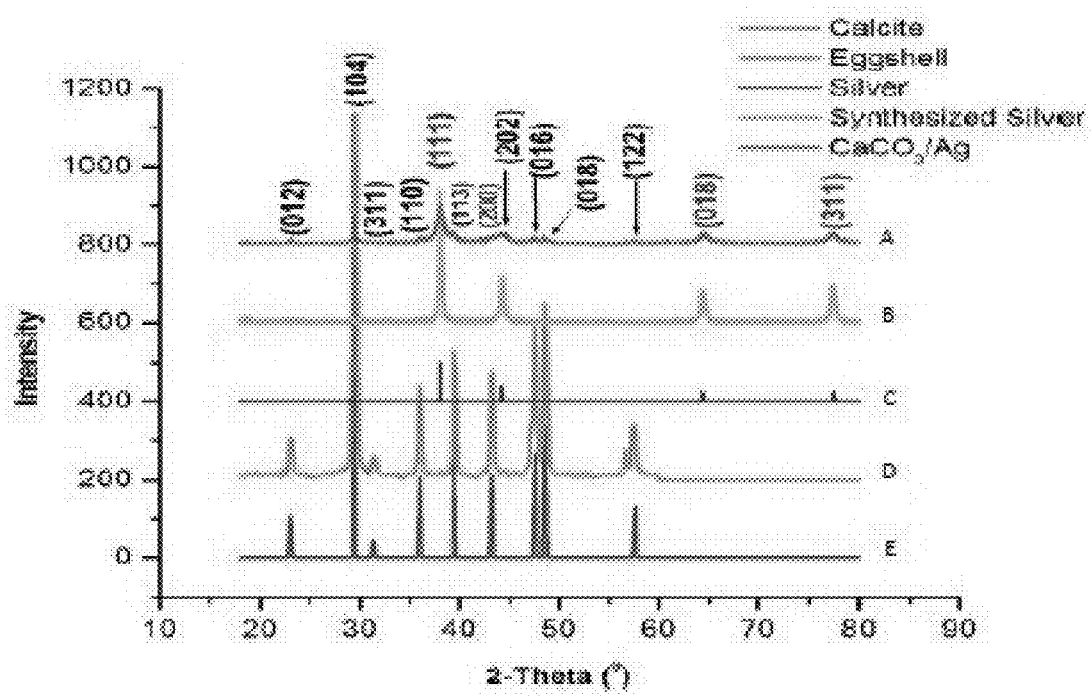
FIG. 7 provides X-Ray diffraction patterns of: A eggshell/silver; B synthesized silver; C silver (lit); D eggshell; E calcite (lit).

FIG. 7 shows the 219 X-ray diffraction patterns of as prepared eggshell sample, as synthesized silver nanoparticles and eggshell/silver composite nanoparticles. The X-ray patterns of these three samples are compared with the Jade library Journal of chemical powder diffraction spectroscopy (JCPDS) X-ray patterns of calcite and silver. As indicated in FIG. 7, curve b the eight most prominent characteristic peaks of eggshell sample at 2θ=23.0° C., 29.4° C., 31.5° C., 36.0° C., 39.4° C., 43.2° C., 47.5° C., 48.5° C., 56.6° C., 57.4° C. and 60.8° C. were corresponding to the crystal faces of (0 1 2), (1 0 4), (1 1 0), (1 1 3), (2 0 2), (0 1 6), (0 1 8), (1 2 2) of calcite with JPCDS card (file No 47-1743) as indicated in FIG. 7 curve A, this confirms that the eggshell sample is calcite, one of the three and most stable of phase of calcium carbonate. FIG. 7 curve D is the X-ray diffraction pattern of as synthesized silver nanoparticles. The four strong distinguishing peaks of the silver sample at 2θ=38.1°, 44.2°, 64.4° and 77.3° also match with Bradley crystal faces of (1 1 1), (2 0 0), (2 2 0) and (3 1 1)

of silver with JCPDS #04-0783. . . .) as shown FIG. 7 curve C. This also confirms the reduction of silver nitrate to silver metallic particles as desired.

The X-ray diffraction pattern of the eggshell/silver composite sample contains two sets of peaks as illustrated in FIG. 7 curve E. It is evident that there are four strong characteristic peaks of the eggshell/Ag composite sample at 2θ=38.1°, 44.2°, 64.4° and 77.3° that correspond to the crystal faces of (1 1 1), (2 0 0), (2 2 0) and (3 1 1) of silver with JCPDS card (file No JCPDS #04-0783) and as indicated in FIG. 7 curve C. The other set of strong characteristic peaks of the composite sample at 2θ=23.0° C., 29.4° C., 31.5° C., 36.0° C., 39.4° C., 43.2° C., 47.5° C., 48.5° C., 56.6° C., 57.4° C. and 60.8° C. were corresponding to the crystal faces of (0 1 2), (1 0 4), (1 1 0), (1 1 3), (2 0 2), (0 1 6), (0 1 8), (1 2 2) of calcite with JCPDS card (file No 47-1743) as shown in FIG. 7 curve A. This confirms the successful synthesis of silver nanoparticles in the presence of eggshell particles. Furthermore the peaks of the eggshell/silver composite sample are broader and less intense as compared to the rest of the other X-ray pattern. The broader peaks suggest that the particles size scale of the composite sample is smaller than the other samples. In fact, it exhibited the characteristic face-centered cubic structure.

Transmission Electron Microscopy (TEM)

The size and shape of the nanoparticles were analyzed using a JEOL-2010 transmission electron microscope (TEM), operating at 80 kV. Samples were prepared by dispersing 5 mg of as synthesized eggshell/silver sample in ethanol by sonicating for 5 min and depositing a drop of the colloidal solution on a carbon grid (carbon coated copper grid), removing the excess solution using a tissue paper and drying at room temperature.

TEM Results

Figure 9A:
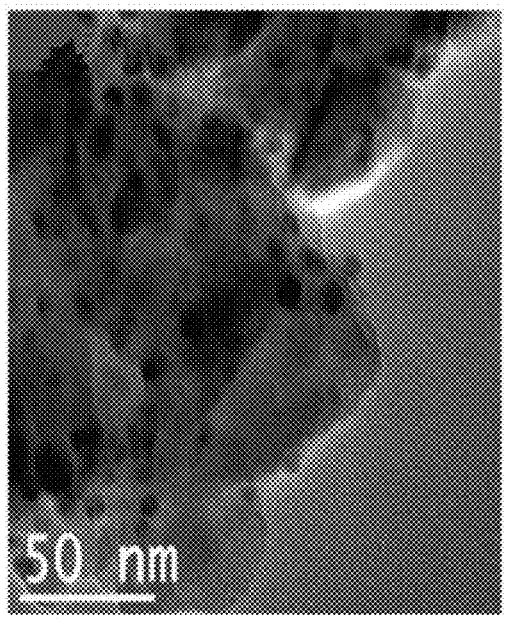
FIGS. 9A-9C provide TEM nano-graph.
Figure 9B:
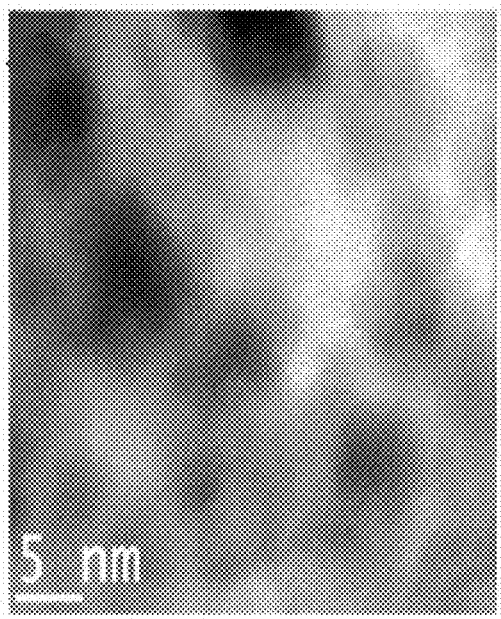
Figure 9C:
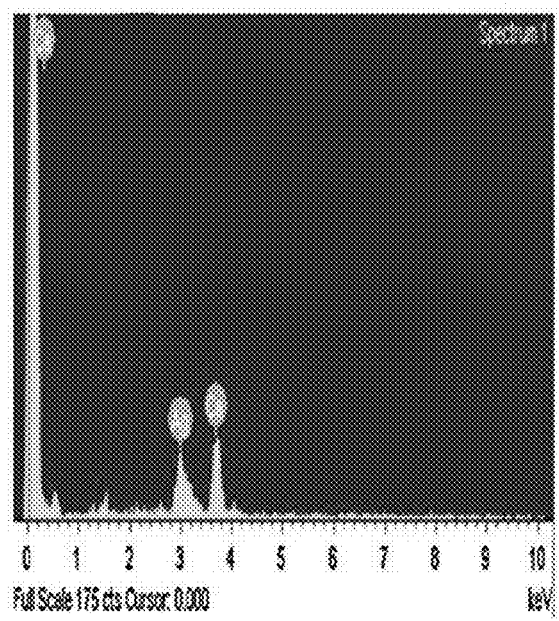

FIG. 9A and FIG. 9B are the TEM micrographs of the composite eggshell/silver nanoparticles. The TEM images show that the size of the particles ranges from 5-20 nm. The particles are spherical in shape. The silver nanoparticles are uniformly distributed with little agglomeration. FIG. 9B shows the eggshell particles are crystalline and lattice planes are visible in the micrograph. FIG. 9C is the energy dispersive spectroscopy spectrum of the composite eggshell/silver particles. It is evident from the EDS spectrum that the synthesized nanocomposite material is elementally composed of silver and calcium as there is no other impurity elements found in the spectrum. The percentage elemental composition of atomic silver in the eggshell/nAg nanocomposite is 18%.

X-Ray Photoelectron Spectroscopy (XPS) Analysis

The surface chemistry of the composite eggshell/nAg powders was investigated using X-ray photoelectron spectroscopy (XPS) measurements. The XPS spectra were acquired with a load-locked Kratos XSAM 800 surface analysis system equipped with 127 mm radius double-focusing concentric hemispherical energy analyzer which was also fitted with an aberration compensated input lens (ACIL), using MgKa (1253.6 eV) radiation source exclusively. Wide and detailed XPS spectra which correspond to medium resolution to high signal-to-noise spectra respectively were collected using FAT (fixed analyzer transmission) mode operating at 80 eV. The magnification of the analyzer in the FAT mode was selected to collect electrons from the smallest allowable (5 mm$^2$) area on the specimen. The samples were mounted on the sample holder using a double-sided adhesive carbon tape with specimens pressed into the double-sided carbon tape to a thickness which insured that the emitted photoelectrons would originate only from the specimen. The sample was transferred to the analysis chamber where the base pressure of the ion- and turbo-pumped system was 8×10$^{-9}$ Torr as read on a nude ion gauge. The elemental composition was first determined using a wide spectra which was then followed by a detailed acquired spectra for quantitative (peak area) and chemical states analysis. The resolution of the instrument at the operating parameters was measured from FWHM of the Ag3d$_{5/2}$ peak to be 1.0 eV. The XPS energy scale was calibrated by setting the Ag3d$_{5/2}$ line on clean silver to exactly 368.3 eV referenced to the Fermi level. Due to specimen charging during X-ray irradiation, the energy axis of each XPS spectra has been shifted to make the C1s binding energy line coincident with 285.0 eV, which is standard hydrocarbon energy (C—H and C—C bonds), used to reference charge affected materials. The potential measured on a typical sample was ~2 eV. The photoelectrons were excited by a water-cooled, conventional (i.e., non-monochromatic) dual anode X-ray gun equipped with an Al window. The angle of the incidence of the x-ray beam with the specimen normal was 51.5°. In cases when the peaks were low in amplitude, the Savitsky-Golay smoothing routine was used in order to help determine the peak binding energies, typically measureable to ~0.1 eV on this system. The XPS surface composition was calculated based on the Scofield cross-sectional values accounting for the instrumental transmission function in the FAT mode of operation.

XPS Results

Figure 10:
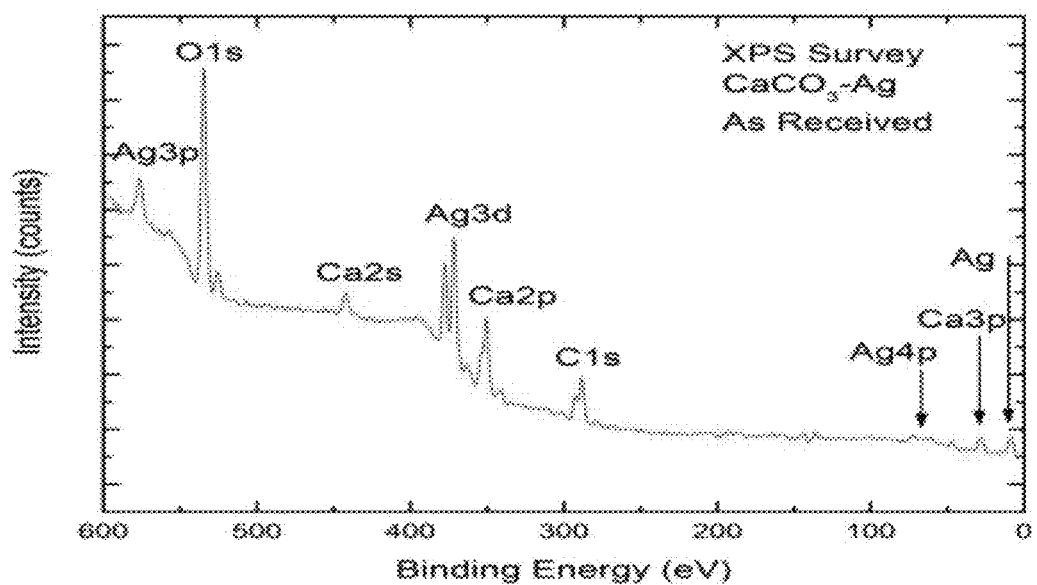
FIG. 10 provides XPS spectrum of $CaCO_3$-Ag showing the surface binding energies (eV) of the constituting elements.

The XPS wide spectrum in FIG. 10 is representative of Eggshell/silver composite sample. This spectrum provides vital information on the structure and chemical state of silver and eggshell (calcium carbonate) of the composite sample. The spectrum shows that the sample is made up of calcium, oxygen and silver with no impurities. There is a doublet at about 363-379 eV. This doublet has binding energies at 374 and 379 eV which are associated with Ag3$_{d3/2}$ and Ag3$_{d5/2}$ respectively. The positions of these peaks are indicative of the formation of metallic silver. In FIG. 10, there is a spin-doublet, Ca2p3/2 at 347.3 eV and Ca2P1/2 at 350.6 eV which have been curve fitted at Ca2P region. The intensity ratio of this doublet peak is 2:1 and is consistent with what is reported in literature. This is indicative of the existence of one chemical state by calcium in the sample. The percentage of elemental composition estimated from the XPS analysis is C (8.2), CA (38.8), O (47.3) and Ag (5.7). The percentage elemental composition of silver on the surface of the eggshell/nAg nanocomposite is 5.7%. This amount is low in comparison to that of EDS measurement of 18%. The difference in the elemental surface composition of silver between the two techniques may due to the difference in the depth of measurements. For example the starting amount of AgNO$_3$ is 2.0 g, which theoretically should yields 1.27 g of Ag nanoparticles. The starting amount of eggshell (CaCO$_3$/organic) matrix is 4.0 g, given that CaCO$_3$ is stable and does not chemically reduce; we assume that the final amount is about 4 g barring any spillage. The theoretical percentage of nAg in the eggshell/nAg nanocomposite is 24%. The EDS analysis value of 18% presents a value close to this estimation. The percentage elemental composition of silver on the surface of the eggshell/nAg nanocomposite is 5.7%. This amount is low in comparison to that of EDS measurement of 18%. The difference in the elemental surface composition of silver between the two techniques may due to the difference in the depth of measurements. In the EDS measurement, the depth of interaction of eggshell/nAg nanocomposite with the X-ray beam increases with the acceleration voltage, so it is more likely that nAg that are buried deeper in the eggshell matrix may be identified by the EDS analysis technique but may not be encountered by XPS whose depth of measurement is only up to 100° A. As the eggshell matrix particles are in micrometer size range with probable pores in same size range, it is possible that some of the nAg particles may absorb into the volume of eggshell matrix beyond the reach or sensitivity of the XPS analysis technique, hence the low value of 5.7%.

Antimicrobial Activity

To examine the antimicrobial effect of the composite eggshell/silver nanoparticles on *Escherichia coli*, modified Kirby-Bauer disc diffusion assay was used as follows. *E. coli*, ATCC (11775) was incubated at 37° C. in 14 ml BD falcon tube to an approximate concentration of $10^7$ colony forming units (CFU)/ml. A lawn of the bacteria was platted on sterile McConkey agar petri dish plates instead of commonly used Mueller Hinton agar, for the ease of visualization of distinctly pink *E. coli* colonies bacteria. The lawns were plated using a sterile cotton swabs. Two sets of sterile circular disc filter papers were placed on the surface of two agar plates. In the first plate labeled as A, five circular disc papers were placed on the *E. coli* lawn. These disc papers were impregnated with 5 1 of 4.0 and 2.0 g/ml of the composite eggshell/silver nanoparticles. The other three discs papers were impregnated with 5 1 of 4.0 g/ml of pristine silver NPs, 50 g/unit penicillin/50 g/ml streptomycin and firth disc used as blank control. The final concentration of the penicillin/streptomycin mixture was prepared from a stock concentration of 5000 unit/ml penicillin and 5000 g/ml of streptomycin in two steps. In the first step, 20 1 of the stock solution was diluted with PBS to a volume of 1 ml and concentration 100 unit/ml penicillin and 1 ml of 100 g/ml of streptomycin. In the second step, 0.5 ml of the 100 unit/ml penicillin/100 g/ml streptomycin diluted with PBS to a volume of 1.0 ml and final concentration of 50 g/unit penicillin/50 g/ml streptomycin. In the second plate labeled as plate B, each of the five discs papers were impregnated with 5 1:2.0 g/ml of eggshell/silver, 2.0 g/ml silver NPs, 2.0 g/ml eggshells particles, PPG and the remaining disc impregnated with PBS. The plates were incubated overnight at 37° C. The zone of inhibition was observed and digital images of the plates were taken.

Antimicrobial Study Results

Figure 6:
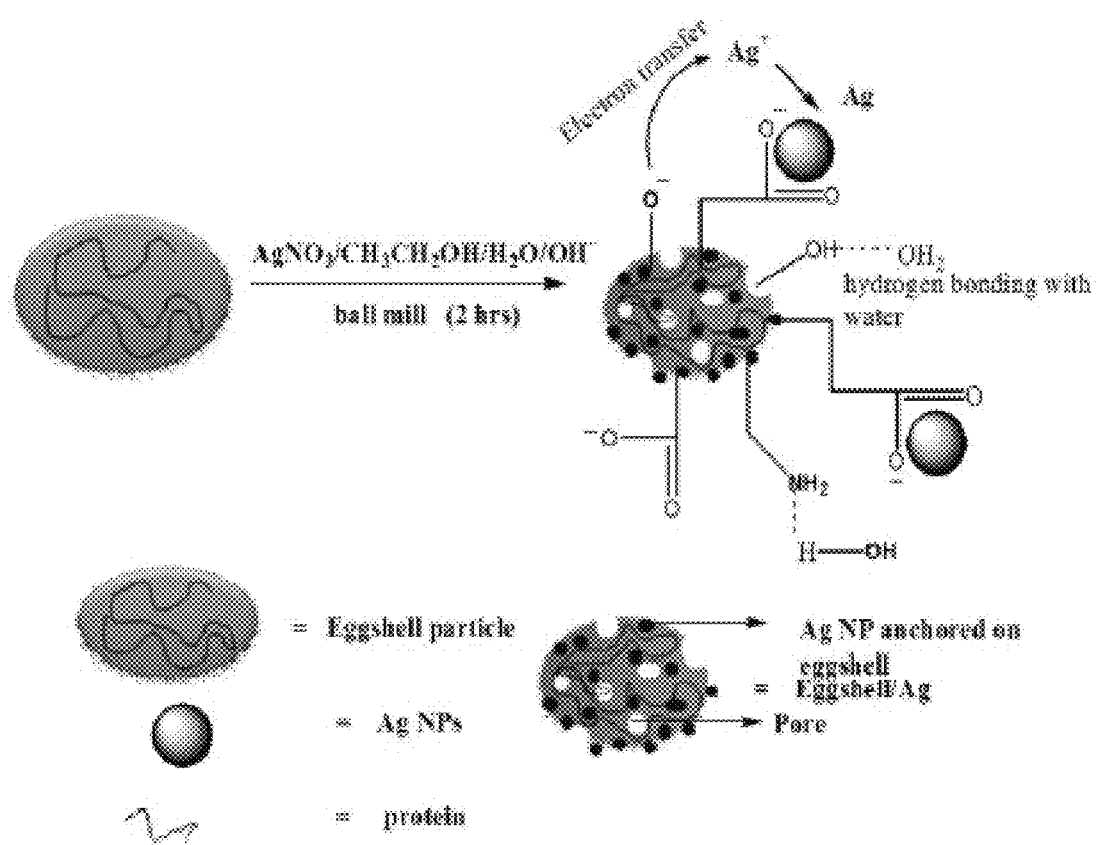
FIG. 6 depicts a possible mechanism of formation of $CaCO_3$/Ag nanocomposites.
Figure 11A:
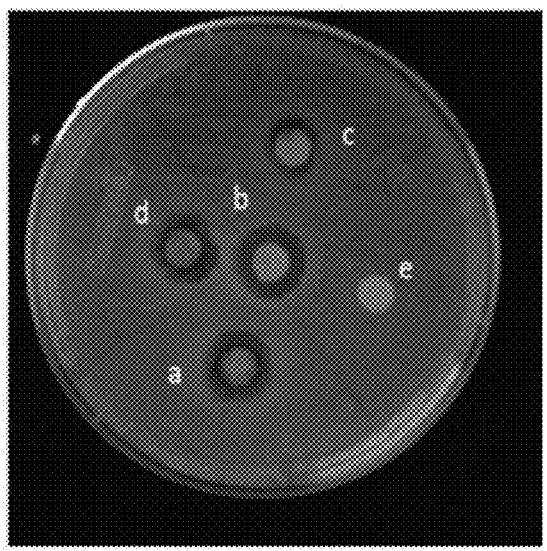
FIG. 11A show shows the results of a modified Kirby-Bauer disc diffusion assay of eggshell/silver nanoparticles. Zone of inhibition observed around the filter paper disc impregnated with 51 of A: 4.0 eggshell/Ag g/ml (a); 1× of penicillin/streptomycin (b); 4.0 g/ml silver NPs (c); 4.0 eggshell/Ag (d); untreated(e).
Figure 11B:
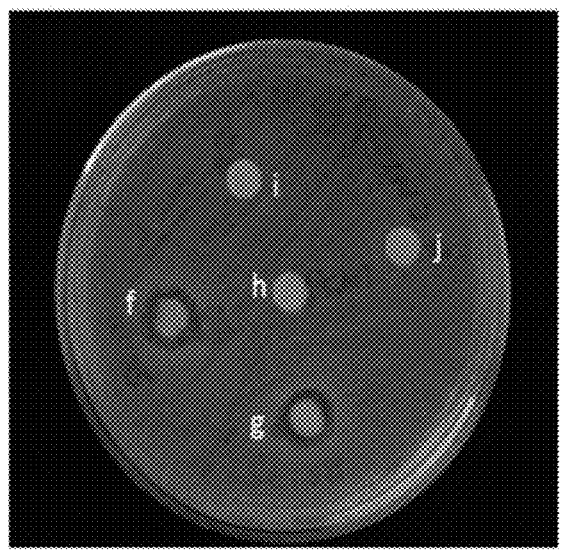
FIG. 11B shows the results of a modified Kirby-Bauer disc diffusion assay of eggshell/silver nanoparticles. Zone of inhibition observed around the filter paper disc impregnated with 5 l of B: 2.0 eggshell/Ag (f); 2.0 of silver NPs (g); 2.0 g/ml eggshell (h) PBS (i); PPG (j), in agar plates seeded with lawns of the bacteria, *Escherichia coli* suspension.
Figures 12A, 12B:
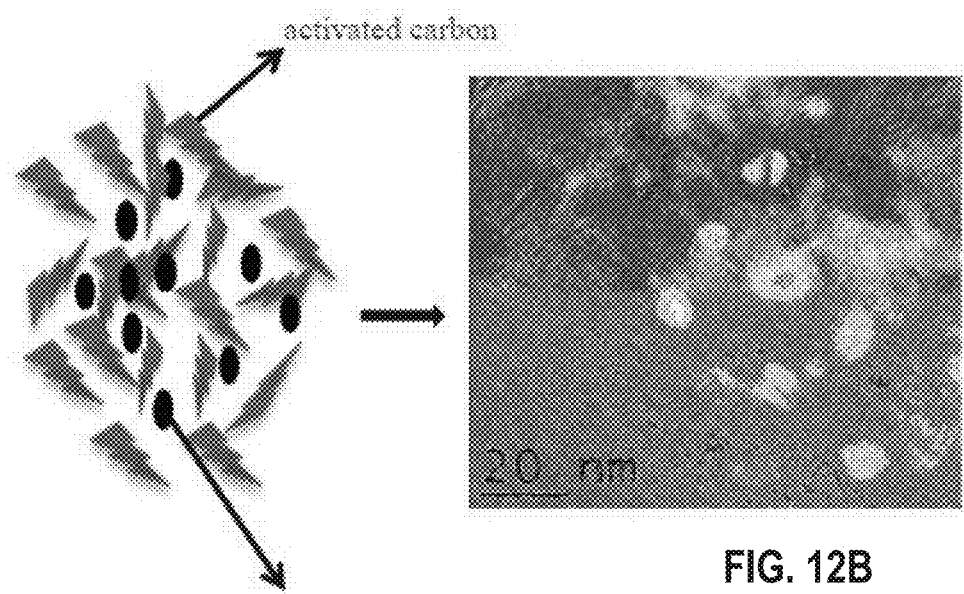
FIG. 12A provides a graphic representation of the silver nanoparticles immobilized on a porous carbon solid matrix.
FIG. 12B provides a photograph of the silver nanoparticles immobilized on a porous carbon solid matrix.
Figures 13A, 13B:
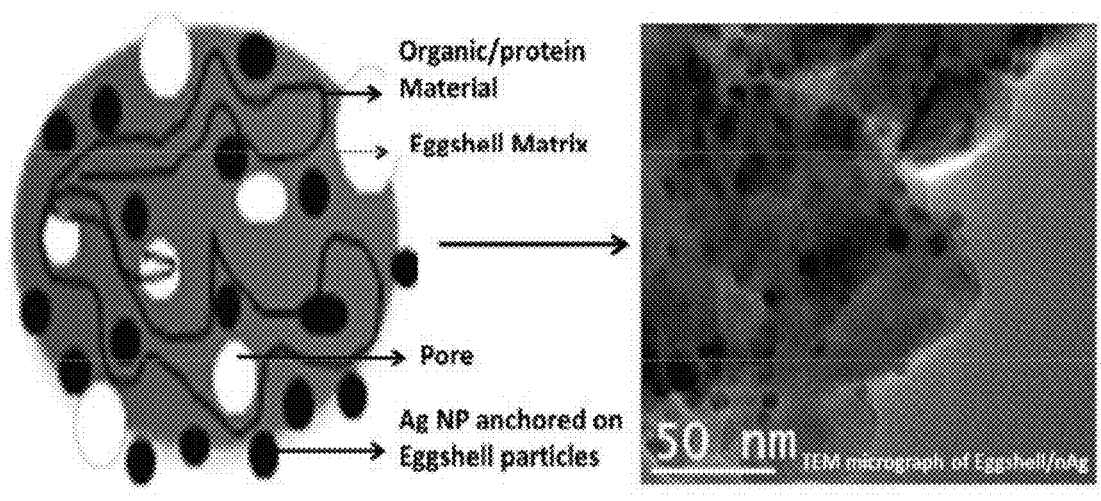
FIG. 13A provides a graphic representation of calcium carbonate silver nanoparticles.
FIG. 13B provides a photograph of calcium carbonate silver nanoparticles.

Antimicrobial activity of the composite eggshell/silver particles was investigated by using a modified Kirby-Bauer disc diffusion assay method and the zone of inhibition of *E. coli* recorded after the bacteria were exposed to various concentrations of eggshell/silver nanoparticles and the vehicles used to suspend the nanoparticles. The inhibitory effect with and without the composite eggshell/silver, silver nanoparticles, eggshell particles and penicillin against *E. coli* is shown in FIG. 11A and FIG. 11B. The eggshell/silver nanocomposite showed exhibited superior antimicrobial activity compared with pristine silver NPs as shown in (FIG. 11A discs a, c and d). The vehicle used in these experiments, phosphate buffered saline (PBS), did not have any inhibitory activity on *E. coli* (FIG. 11B, disc i). Since our test material is a composite material, we also tested the antibacterial effects of the individual eggshell particles that were made using the same method as the composite and the eggshell showed no antibacterial inhibitory effect on *E. coli* (FIG. 11B, disc h). This is attributed to the effect of the eggshell particles. A reason for the superior antimicrobial activity of the eggshell/Ag nanocomposite to pristine silver is attributable to the ease of dispersion of the nanocomposite and for that matter the silver nanoparticles in aqueous solution. The inherent hydrophilic groups of the bio-base derived eggshell particles of the nanocomposite interact through hydrogen bonding with the water molecules this overcomes the hydrophobic inorganic particles and the heavy silver metal resulting in a uniform solution (FIG. 6). Consequently the silver nanoparticles are brought close to the bacteria resulting in direct interaction of the bacteria and the silver nanoparticles. The reduction in the size of the eggshell particles from bulk to micron or nanometer scale size ensures that the hydrophilic protein functional groups are able to overcome the hydrophobic nature of the eggshell particles resulting in uniform dispersion of the silver nanoparticles in aqueous solution. The ball milling method does two things simultaneously, it physically reduces the size of the eggshell and at the same time chemically reduces silver ion ($Ag^+$) to silver metal nanoparticles ($Ag^0$). This is significant in that it precludes the use of toxic reducing agents which could pose environmental concerns. The SEM and TEM micrographs indicate that the eggshell particles form structural support for the silver nanoparticles in the nanocomposite; this reduces the agglomeration of the silver nanoparticles and enhances their activity as compared to the pristine silver nanoparticles. The exclusive existence of calcium only in the form of calcium carbonate in the nanocomposite as shown by both XRD and XPS spectra indicates that the solubility of the nanocomposite in solution is due to the protein hydrophilic functional groups. This also excludes the presence of calcium oxide which in solution could have solubilized the nanocomposite. Bacteria (*E. coli*) interact readily with hydrophilic surfaces; as a result the bacteria may easily adhere to the hydrophilic surface of the nanocomposite, where the silver particles of the composite could kill the bacteria. Such a property of this eggshell-Ag composite material in this report makes it a good candidate for filtration application. The use of a pH sensitive material, calcium carbonate (eggshell) as a matrix may promote pH release of the silver nanoparticles.

Results and Discussion: The Possible Mechanism of Formation of Eggshell/nAg Nanocomposite Protein eggshell is made up of 95% calcium carbonate and about 3% protein. This proportion of protein and other organic matrix keep the shell tough and prevents it from shattering. The nucleation of the eggshell particles starts at the nanoparticle level with the deposition of calcium ions and a protein matrix which builds the shell from the bottom up. We have shown that protein eggshell can be reduced to nanoparticle size using the ball milling technique from top to bottom. The reduced eggshell particles are not normally soluble in aqueous solution unless they are in critical size dimension such that the hydrophilic groups on the surface solvates the massive inorganic calcium carbonate component of the shell. But as the size of the eggshell particles is reduced to nano size, a larger surface area to volume ratio of the calcium carbonate is exposed revealing more protein hydrophilic groups. These hydrophilic functional groups on the surface of a tiny particle (of nano dimension) interact with aqueous solution through intermolecular hydrogen bonding resulting in the eggshell particles becoming soluble in solution as in FIG. 6. This is significant in that the calcium carbonate in the form of the eggshell is now available to take part in chemical reactions in aqueous solution which hitherto was not possible. The carboxylic acids protons are deprotonated by the sodium hydroxide base in the ball milling process. In the ball milling process silver nitrate ($AgNO_3$) is reduced to silver nanoparticles. The following mechanism is proposed for this reaction and schematically shown in FIG. 6. The deprotonated carboxylic groups stabilize silver ions ($Ag^+$) on the surface of the eggshell particles. Subsequently an electron transfer from the oxygen ion to the silver ion ($Ag^+$), converts the silver ion to silver metal nanoparticle ($Ag^0$). The micron size of the eggshell particles is an advantage that the porosity of the particles is intact and this facilitates the movement of water if used as a filter material. The silver nanoparticles are evenly distributed on the surface of the eggshell particles except in some few places where there is particle agglomeration. It is obvious that silver nanoparticles are spontaneously adsorbed on the surface of the eggshell. This is similar to previous reports that the high surface energy of calcite led to the adsorption of $Cu^{2+}$ ions onto its surface. This effect coupled with other factors such as high porosity of the ball milled calcite particles and the presence of eggshell macromolecule chemical groups particularly oxygenated functional groups on the surface of the calcite particles may preferentially direct silver nanoparticles to the surface of the micron scale calcite particles. Moreover the ball milling used in the size reduction of eggshell sample increases the surface area to volume ratio of the eggshell exposing new surfaces with high surface energy for attachment of the silver nanoparticles.

Example 3: Water Filtration Study

The water filtration properties of the activated charcoal/silver nanocomposites filtration columns were investigated by comparing their ability to remove metals, phosporus, oils, great hexanes and surfactants from contaminated water collected from a car wash. The detection of these contaminates was quantified, as evidenced in Table 2 below. The lack of heavy metals, phosphorus, oil, grease hexamine after filtering the car wash waste water demonstrates the ability of the filters to adsorb these contaminates from the water source. Therefore, the present invention comprises methods for reducing metals, phosporus, oil, grease hexamines, pesticides, herbicides from waste water by filtering through a filter comprising silver nanocomposites embedded on an activated charcoal matrix and $CaCO_3Ag$ nanoparticles.

TABLE 2

| Parameters | Results | Flag | Units | RDL | Method |
|---|---|---|---|---|---|
| WET CHEMISTRY | | | | | |
| Chemical oxygen Demand (COD) | 75 | | mg/L | 5 | EPA 410.4 |
| Oil/Grease Hexane | ND | | mg/L | 2.7 | EPA 1664B |
| pH | 8.08 | | pH Units | | S4500HB-00 |
| Phosphorous | 0.30 | | mg/L | 0.10 | EPA 365.1 |
| Surfactants (MBAS) | 6.47 | | mg/L | 0.250 | S5540C-00 |
| Total Dissolved Solids | 280 | | mg/L | 5 | S2540C-11 |

TABLE 2-continued

| Parameters | Results | Flag | Units | RDL | Method |
|---|---|---|---|---|---|
| Total Suspended Solids | ND | | mg/L | 5 | S2540D-11 |
| METALS | | | | | |
| Arsenic | ND | | mg/L | 0.0090 | SW846 6010C |
| Barium | 0.031 | | mg/L | 0.011 | SW846 6010C |
| Cadmium | ND | | mg/L | 0.0022 | SW846 6010C |
| Chromium | ND | | mg/L | 0.0056 | SW846 6010C |
| Lead | ND | | mg/L | 0.0067 | SW846 6010C |
| Mercury | ND | | mg/L | 0.00050 | SW846 7470A |
| Selenium | ND | | mg/L | 0.022 | SW846 6010C |
| Silver | 0.12 | | mg/L | 0.0044 | SW846 6010C |

The various preferred embodiments and experiments having thus been described, those skilled in the art will readily appreciate that various modifications and variations can be made to the above described preferred embodiments without departing from the spirit and scope of the invention. The invention thus will only be limited to the claims as ultimately granted.

The invention claimed is:

1. A water filtration system comprising:
   a filter, the filter includes a mixture of two components:
   a) silver nanoparticles immobilized on a porous carbon solid matrix; and
   b) calcium carbonate silver nanoparticles;
   wherein a) and b) are present in a ratio in a range from 20:80 to 10:90.

2. The filtration system of claim 1, wherein the silver nanoparticles immobilized on the porous carbon solid matrix are prepared in a one-step wet ball milling process wherein the wet ball milling process does not use an environmentally hazardous reducing agent or an organic stabilizer.

3. The filtration system of claim 1, wherein the calcium carbonate in the calcium carbonate silver nanoparticles is isolated from egg shells.

4. The water filtration system of claim 1, wherein the porous carbon solid matrix comprises carbon nanoparticles.

5. The water filtration system of claim 1, wherein the silver nanoparticles are between the size of 10-35 nanometers.

6. The water filtration system of claim 1, wherein the calcium carbonate silver nanoparticles are between the size of 5-20 nm.

7. The water filtration system of claim 1, further comprises:
   c) a column tube including a top configured to receive waste water that is filtered by the mixture,
   wherein the filter is in the column tube.

8. The water filtration system of claim 7, wherein the column tube comprises a column chromatography tube.

9. A water filtration system comprising:
   a filter, the filter includes a mixture of two components:
   a) calcium carbonate silver nanoparticles forming a percentage of the filter; and
   c) silver nanoparticles immobilized on a porous carbon solid matrix and forming another percentage of the filter,
   wherein the filter filters waste water at a faster speed as compared to a filter with a) alone; and
   wherein a) and b) are present in a ratio for metal removal from waste water in a range from 80:20 to 90:10.

10. The filtration system of claim 9, wherein the mixture is a dry mixture.

11. The filtration system of claim 9, wherein the silver nanoparticles immobilized on the porous carbon solid matrix are prepared in a one-step wet ball milling process wherein the wet ball milling process does not use an environmentally hazardous reducing agent or an organic stabilizer.

12. The filtration system of claim 9, wherein the calcium carbonate in the calcium carbonate silver nanoparticles is isolated from egg shells.

13. The filtration system of claim 9, wherein the porous carbon solid matrix comprises carbon nanoparticles.

14. The filtration system of claim 9, wherein the silver nanoparticles are between the size of 10-35 nanometers.

15. The filtration system of claim 9, wherein the calcium carbonate silver nanoparticles are between the size of 5-20 nm.

16. The filtration system of claim 9, further comprises:
   c) a column tube including a top configured to receive waste water that is filtered by the mixture,
   wherein the filter is in the column tube.

17. The filtration system of claim 16, wherein the column tube comprises a column chromatography tube.

\* \* \* \* \*